United States Patent [19]

Thompson

[11] Patent Number: 4,830,776
[45] Date of Patent: May 16, 1989

[54] ADHESIVE COMPOSITES FOR BIOMEDICAL ELECTRODES

[75] Inventor: James A. Thompson, Akron, Ohio

[73] Assignee: La Jolla Technology, Inc., San Diego, Calif.

[21] Appl. No.: 907,575

[22] Filed: Sep. 15, 1986

[51] Int. Cl.$^4$ ............................................... H01B 1/00
[52] U.S. Cl. ...................... 252/500; 524/45; 524/521; 524/43; 524/44; 128/798; 128/802
[58] Field of Search ............. 252/500; 523/122; 524/45, 43, 54, 55, 44, 500, 501, 502, 516, 521, 61; 128/640, 798, 802; 604/897

[56] References Cited

U.S. PATENT DOCUMENTS

| | | | |
|---|---|---|---|
| 3,288,770 | 11/1966 | Butler | 260/88.3 |
| 4,125,110 | 11/1978 | Hymes | 128/2.06 E |
| 4,248,247 | 2/1981 | Ware et al. | 128/798 |
| 4,273,135 | 6/1981 | Larimore et al. | 128/640 |
| 4,352,355 | 10/1982 | Larimore et al. | 128/640 |
| 4,458,696 | 9/1984 | Larimore et al. | 128/798 |
| 4,524,087 | 6/1985 | Engle | 427/2 |
| 4,588,762 | 5/1986 | Mruk et al. | 524/45 |

OTHER PUBLICATIONS

U.S. patent application Ser. No. 049,212, filed June 15, 1979 (Ware et al.).

*Primary Examiner*—Josephine Barr
*Attorney, Agent, or Firm*—Brown, Martin, Haller & McClain

[57] ABSTRACT

Electrically conductive, pressure sensitive adhesive composite formulations comprising adhesive polymers, electrically conductive quaternary ammonium polymers, electrically conductive water soluble and water swellable polymeric fillers for imparting cohesiveness to said composite, and additionally, chemical agents that retard oxidative or microbial degradation of the composite. The composite formulations yield a flexible and extensible material that is suitable as an adhesive for biological electrodes, particularly transcutaneous electrical nerve stimulation electrodes.

8 Claims, No Drawings

ADHESIVE COMPOSITES FOR BIOMEDICAL ELECTRODES

BACKGROUND OF THE INVENTION

Described herein are adhesive composites for use with biomedical electrodes. The adhesive composites are of the pressure sensitive type, being adherent to a person's skin by pressing the composite onto the skin. Application of the composite to the skin effectuates an electric circuit between the skin and medical electrostimulating or recording devices that communicate via suitable attachments with the composite.

By way of background, it is important to understand various features of adhesive composites that are employed with biomedical electrodes. Generally they contain an electrically conductive paste or gel and a pressure sensitive component. To some extent the paste or gels have adhesive properties, but that is not their primary function; rather they primarily serve as electrical conductors. In contrast, the adhesive component acts to affix the composite to a suitable surface and is functionally related to adhesive tapes well known to those in the art. It is important to note though, that the function of the adhesive composite, unlike adhesive tapes, is two-fold; first, it acts to secure the biomedical electrode firmly to the patient's skin, and, second, it provides a current path between the electrode itself and the surface of the skin. A further property of the adhesive composite is that it also must adhere to a backing material in those instances where the same is employed with the electrode device.

Adhesive composites are a subclass of adhesive materials used for a variety of purposes and that can be categorized into one of three classes, depending upon whether the adhesive property is initiated by pressure, heat, or is solvent activated. Solvent activated tapes are in every day use, a common example being "gummed tapes" used for sealing cartons, envelopes and the like. Their adhesive properties are realized by applying a solvent, usually water to the tape, and then applying the tape to a suitable surface.

Adhesives that are activated by heat are most often employed in garment repair, fabric mending, or the like. The adhesive nature of these materials is a result of a bond produced by heat between the adhesive material and the substrate material to which it is applied.

The third class of adhesive materials consists of those that are activated by pressure and are termed "pressure sensitive" composites. The adhesive composite of the subject patent would be considered a member of this class. A key characteristic of these adhesives is that they adhere rapidly to most solid surfaces as a result of moderate finger pressure. Such adhesives can be readily and easily secured to the skin to provide a current path between the skin and the electroconductive elements of a biomedical electrode. Further desirable properties of such adhesives are that they can be easily removed from a patient's skin without having to employ excessive force or solvents.

The prior art shows a number of adhesive composites used with biomedical electrodes. In order to appreciate the technical problems associated with developing suitable adhesive composites, it is important to note that they were initially developed to avoid using adhesive paste, gels and the like, which served a dual purpose of enhancing conductivity of the electrode with the skin, as well as securing the electrode to the skin. These types of electrodes are referred to as "wet" electrodes. To avoid the sloppiness and packaging problems associated with "wet" electrodes, adhesive composites were developed that are termed "dry" electrodes. Although "dry" electrodes have circumvented the problems associated with "wet" electrodes, they generally do not have high electrical conductivity with the skin primarily because of the presence of conductive filler needed to impart to the composite the necessary adhesive and cohesive properties desired. Thus, often "dry" electrodes have a high signal-to-noise ratio. This problem has remained largely unsolved.

The prior art shows a number of patents directed to "dry" electrodes. U.S. Pat. No. 4,125,110 shows a naturally occuring polymer, gum karaya, used for securing the electrode to the skin. Gum karaya is a polysaccharide containing bound metallic ions. In contrast to the use of natural polymers, U.S. Pat. Nos. 4,273,135 and 4,352,359 show several types of acrylic based polymers employed as the conductive element in a "dry" disposable biomedical electrode adhesive composite. Further, in addition to acrylic or methacrylic polymers, U.S. Pat. No. 4,248,247, and abandoned U.S. patent application Ser. No. 049,212 filed June 21, 1979 show the use of polymers of isobutylene and butylenes.

In addition to the patents referred to above, other patents describe the use of filler materials having both high electrical conductivity and adhesive properties. For instance U.S. Pat. No. 4,524,087 describes an electrically conductive material consisting of polymers of polyhydric alcohol. The use of the latter compound is thought to enhance the conductive properties of the adhesive composite. Further, U.S. Pat. Nos. 4,588,762 describes a pressure sensitive adhesive composite for use with disposable biomedical electrodes wherein the composite consists of a viscoelastic polymeric adhesive phase and a electrically conductive aqueous phase containing a water receptive polymer, a humectant and an electrolyte. The electrically conductivity properties of the composite are enhanced by intimately dispersing the two phases.

Considerable effort has gone into maximizing the electrically conductive properties of adhesive composites used to fabricate biomedical electrodes, with little or no compromise in the adhesive property of the composite. At present there is a need for adhesive composite formulations that are suitably adherent to the skin, yet are skin conformable and have high electrical conductivity.

SUMMARY OF THE INVENTION

In accordance with the present invention, a adhesive composite is provided which is capable of being affixed to the surface of the skin of a patient, yet is flexible and extensible. Moreover, the adhesive composite has uniquely high electrically conductive properties as a consequence of including in the formulation of the composite, a polycationic water soluble, synthetic, organic quaternary ammonium polymer. The latter coacts with other constituents in the formulation to yield an adhesive composite having a bulk resistivity of not greater than 1,000 ohm-centimeter (DC).

In order to achieve the desired electrical properties of the adhesive composite, formulation of the composite includes a viscoelastic polymeric phase for imparting adhesive and cohesive properties to the adhesive and an electrically conductive aqueous phase comprising, in addition to the quaternary ammonium polycationic polymer, a water receptive polymer means for absorbing moisture. Also, the composite contains a humectant means for entraining and retaining moisture in the composite which enhances its conductive properties.

A particularly suitable formulation of the composite involves composing the viscoelastic polymeric phase of polyisobutylene polymers having different molecular weights. However, in addition to polyisobutylene, it is intended that the invention described herein cover polymers of butene as well as chemically related polymers. These polymers have the necessary tack to impart to the composite the desired adhesive quality, yet coact with the quaternary ammonium polymer to provide for a composite having favorable electrically conductive properties.

The adhesive composite also consists of additional substances, particularly humecatants and water-receptive polymers, that contribute to the overall conductive properties of the composite, and that allow for hydration of the skin surface upon which the adhesive is affixed. Also, they prevent a loss of adhesion due to elevated temperatures, or changes in humidity conditions. Lastly, chemical agents that retard or prevent either chemical or microbial destruction of the composite can be included.

DETAILED DESCRIPTION OF THE INVENTION

The heterogenous composition which comprises the pressure sensitive adhesive composite of the present invention is a result of the interaction of several constituent components, each of which imparts a particular property to the composite. Some of these components play a primary essential role in establishing the functionl nature of the adhesive composite, while others have a secondary role aimed at preventing chemical or microbial destruction of the composite. Table I describes the principal components of the adhesive composite, as well as their function.

| COMPONENT | FUNCTION |
| --- | --- |
| Viscoelastic polymers | Imparts tack to adhesive composite |
| Water-receptive polymer | Water swellable strengthening agent capable of acting as a conductive filler |
| Humectant | Wetting agent providing a conductive media, and also a support filler |
| Water | Hydrating agent |
| Quaternary ammonium polymer | An electrically conductive polymer |

In addition to the above described components of the adhesive composite formulation, there may be present chemical preservatives that retard the oxidation of the components, as well as bacterial static agents that retard microbial growth.

In the preferred embodiment of the invention, the viscoelastic polymeric phase comprises polyisobutylene and copolymers or mixed polymers of the same, wherein the polymers are present in at least two molecular weight range fractions. While it is anticipated that formulations having polyisobutylene polymers in the molecular weight range of 1,000 to 350,000 will be useful, the preferred molecular weight range is from about 50,000 to 70,000. It is anticipated further that polybutenes having molecular weights of approximately 50–56,000 and 57–68,000 will be most extensively used in the adhesive composites.

It will be appreciated by those skilled in the art that the term "polyisobutylene" is intended to include polymers of polybutene, as well as polybutylene and other chemically similar butyl rubber polymers such as polymers of butene-1 and butene-2.

A variety of different molecular weight polyisobutylene polymers are available from commercial suppliers. Polyisobutylene having a molecular weight ranging from about 57,000 to 68,000 is sold under the trade name "Vista nex LM H LC" by Exxon Corporation. Further, polyisobutylene having molecular weights ranging from about 50,000 to 56,000 is also sold under a similar trade name, "Vistanex LM-MH-LC". It too is sold by Exxon.

In the preferred embodiment of the invention, about 4–7 units by weight of polyisobutylene having a molecular weight of 50,000–56,000 is used with each unit of polyisobutylene with a molecular weight range of 57,000–68,000.

The second component of the adhesive composite formulation is a water receptive polymer. The latter is either water soluble or water swellable. The term "swellable" describes a polymer matrix that imbibes solvents with a concommitant increase in the volume of the matrix. Water receptive polymers which are cross linked and are swellable, and therefore insoluble, are preferred in the subject invention. An example of a water insoluble, and swellable polymer is cross linked carboxymethylcellulose. It can be purchased from Hercules Corporation under the trade name, "Aqualon". It is anticipated that about one half the an amount by weight relative to the low-molecular weight polyisobutylene will be used.

In addition to carboxymethylcellulose, a variety of other water receptive polymers, well known to those skilled in the art, are anticipated to perform satisfactorily in the adhesive composite. A partial listing of these include synthetic as well as natural polymers and synthetically modified natural polymers. Examples of synthetic polymers are polyacrylamide or salts of polyacrylates (sodium polyacrylate) and derivatives of polyvinylmethylether or polyvinylpyrrolidone. Natural polymers that may be used in the subject invention are karaya gum, or cross linked dextran. The latter is commonly sold under the trade name, "Sephadex", which is a product of Pharmacia Fine Chemicals, AE, Uppsala, Sweden. In addition to carboxymethylated cellulose, another synthetically modified cellulose polymer is hydroxy ethyl cellulose. It will be anticipated that copolymers of any of the water receptive polymers described above may also be useable in the subject adhesive composite.

The third key component in the adhesive composite is an electrically conductive cationic polymer. A variety of cationic water soluble quaternary ammonium polymers are particularly useable in the subject invention, and some of the more suitable choices are described in U.S. Pat. No. 3,288,770, and in *McCutcheon's Detergents and Emulsifiers,* 1973 Annual. Both of these references are hereby incorporated into the present patent.

Typical monomers from which the quaternary ammonium polymers are polymerized include, as defind in said U.S. Pat. No. 3,288,770:

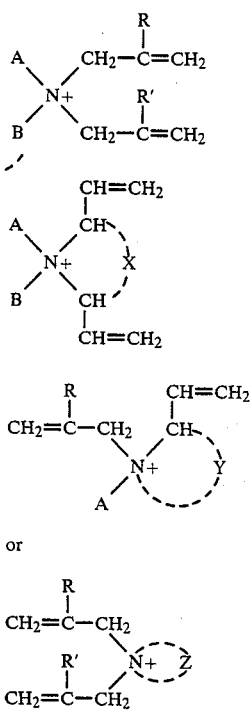

or

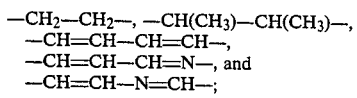

wherein

A and B independently represent a member selected from the class consisting of alkyl and phenyl radicals on which any substituents are selected from the group consisting of hydroxy, amido, carbo lower alkoxy, lower alkoxy, phenoxy, naphthoxy, cyano, thiophenoxy, lower alkoyl, 5- and 6-membered cycloalkyl, tri (loweralkoyl) ammonium lower alkyl, with, on the alkyl groupings only, a nitro group, and, on the phenyl radicals only, a halogen atom; and taken together, A and B represent a member selected from the group consisting of —CH$_2$—CH$_2$—, —CH(CH$_3$)—CH(CH$_3$)—,
—CH=CH—CH=CH—,
—CH=CH—CH=N—, and
—CH=CH—N=CH—;

R and R' independently represent a member selected from the group consisting of hydrogen, chloro, bromo, lower alkyl, and phenyl radicals;

X represents a divalent radical of the formula

—CH$_2$—(0)$_n$—(CH$_2$)$_m$—

Y represents a divalent radicl of the formula

—(CH$_2$)$_p$—(0)$_n$—CH$_2$—

Z represents a divalent radical of the formula

—(CH$_2$)$_p$—(0)$_n$—(CH$_2$)$_2$— and;

n is one of the numbers 0 and 1;
m is one of the numbers 1 and 2; and
p is one of the numbers 2 and 3. Because of the polycationic nature of such quaternary ammonium polymers, there are present numerous ionic sites which impart to the polymer a high degree of electroconductivity. This property of the polymer is particularly favorably employed in the subject adhesive composite because its electroconductive properties are maintained under changing humidity conditions. The concentration of cationic groups in the polymer is not critical so long as the required level of electroconductivity is met. Also, the molecular weight of the polymer is similarly not critical, although higher molecular weight polymers generally perform better than their lower molecular weight counterparts. Lastly, it should be noted that the quaternary ammonium polymer coacts favorably with the other components present in the adhesive composite, in part because in addition to its conductive properties, it is thermodynamically driven to partially solvate and/or swell either both or the base polymer (polyisibutylenes) and hydrophilic components rendering a homogeneous interpenetrating network.

It will be appreciated by those skilled in the art that while the subject invention has as its preferred embodiment an adhesive composite having a quaternary ammonium polycationic polymer as a key electroconductive element, that in fact it is to be anticipated other polymers having other charged groups that are functionally similar to a quaternary ammonium group will perform satisfactorily. Thus, other cationic polymers that are anticipated as being useable are polymers of quaternary phosphonium salts and ternary sulfonium salts, particularly of poly (vinylbenzyl chloride) and polyepiahalohydrin and the like.

In addition to the above components, the adhesive composite is further formulated from materials that have a dual function, that is, that act as conductive media to enhance the electroconductive properties of the composite, as well as filler material that imparts strength and skin conformability to the composite. To a certain extent, the quaternary ammonium polymer has these features. However, the primary function of the quaternary ammonium polymer is to increase the electrical conductive nature of the composite. A variety of hydrophilic fillers are well known to those skilled in the art. In the preferred embodiment of the invention, pectin is most suitable but most water soluble hydrocolloids will perform equally well. Thus, alginates, gums and the like are anticipated to be suitable for use in the subject adhesive composite. Pectin can be obtained from a number of commercial sources, for example; it is readily purchased from Hercules Corporation. We have had good success with pectin obtained from A/S Kobenhavens Pectinfabrik under the trade name, "Genu".

The remaining components of the adhesive composite are water, chemical preservatives and microbial agents to prevent chemical and/or microbial destruction of the components of the composite. An example of a suitable preservative is butylated hydroxytolulene, obtainable from Sherwin Williams, while a suitable microbial agent is 2,4,4'-trichloro-2'-hydroxydiphenyl ether, sold under the trade name, "Irgasan DP-300", and obtainable from Ciba Geigy. It will be understood by those skilled in the art that these are merely two of many possible such agents that are useable.

The adhesive composite, in addition to having favorable electrical properties, has other desirable features. Because the adhesive composite will primarily be employed in bioelectrodes, the composite must be sufficiently compliant to conform to the surface of the skin, and additionally, be flexible and extensible. Also, the affinity of the composite for skin must be such that when the composite is removed, any residue is easily washed off using routine washing procedures. The adhesives composite described herein has these properties. The flexible and extensible properties are similar to those described in U.S. Pat. No. 4,458,696. Moreover, the composite shows a high degree of skin conformability since, for example, it is able to remain affixed to the bony portion of a human elbow joint for at least eight hours. Moreover, little or not residue is left attached to a patient's body after the composite is removed, and any that is left remaining is readily washed off the skin.

The invention described herein is further illustrated by the following examples. The examples should not be construed as limiting the invention, but as merely illustrative of the materials and methods used to practice the invention.

EXAMPLE I

About 28 grams of polyisobutylene having a molecular weight of about 50,000–56,000 and 5.6 grams of a second polymer of polyisobutylene having a molecular weight of about 57,000–67,000, were combined in a heavy duty, high shear mixer, and about 15 grams of cross linked sodium carboxymethylcellulose and 10 grams of pectin were added. These components were then mixed for approximately 50 minutes, as during this period about 0.4 grams of a chemical preservative, butylated hydroxytoluene, and 0.2 grams of an antimicrobial agent, "Irgasan DP-300" were also added. Subsequently about 28 grams of water, and about 28 grams of the quaternary ammonium polymer, polydiallyldimethylammonium chloride were added. The latter two components were added in four separate aliquots with mixing for 45 minutes between each addition.

The resulting mixture had a "dough-like" consistency which was easily extrudable or rolled into a desirable shape or thickness.

EXAMPLE II

With the exception of pectin, the materials and methods used in this example are the same as those as described in Example I. In this example, about 10 grams of non-cross linked carboxymethylcellulose was utilized in lieu of pectin.

EXAMPLE III

The mechanical properties of the adhesive composite formulated in Example I were determined using standard methods. These are shown in Table I.

TABLE I

| Mechanical Properties[1,2] | | |
|---|---|---|
| maximum extensibility | x axis | 50% |
| | y axis | 50% |
| stress at 20% elongation | | 2 lb/in width |
| stress relaxation at 20% elongation (x, y axis) | | |
| after 1 minute | | 25% |
| after 10 minutes | | 50% |
| maximum tensile set after 10 minutes @ elongation (x, y axis) | | 10% |
| maximum compression set after 10 minutes @ 20% compression (z axis) | | 10% |

[1]Measured per most current revision of ASTM D882 where applicable.
[2]x and y axis are in the plane of the electrode, z axis is normal to the plane.

It will be appreciated by those skilled in the art that while this invention has been described with reference to particular preferred embodiments and materials and methods of practicing the same, it is clear that the invention is not limited thereto. Indeed, it will be apparent to those skilled in the art that modifications to the methods and products disclosed herein fall within the scope of the following claims.

I claim:

1. An electrical conductive, pressure sensitive adhesive composite viscoelastic film comprising:

| CHEMICALS | PARTS BY WEIGHT |
|---|---|
| Low molecular weight viscoelastic isobutylene polymer (molecular weight range about 50,000–56,000) | 25–30 |
| High molecular weight viscoelastic isobutylene polymer (molecular weight range about 57,000–68,000) | 5.0–6 |
| Water receptive polymer | 14.7–16.0 |
| Humectant | 9.7–11 |
| Preservative | 0.30–0.40 |
| Microbialostat | 0.15–0.25 |
| Water | 25–30 |
| Quartesnary ammonium electrically conductive polymer | 25–30 |

2. The adhesive composite viscoelastic film as described in claim 1 wherein said electrically conductive quaternary ammonium polymer is polydiallyldimethylammonium chloride.

3. The adhesive composite viscoelastic film as described in claim 1 wherein said quaternary ammonium polymer is polymerized from monomers selected from the group consisting of

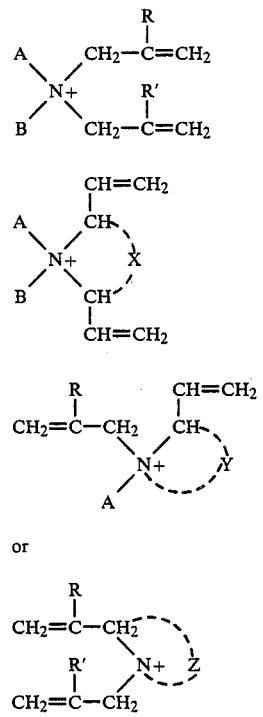

or wherein
A and B independently represent a member selected from the class consisting of alkyl and phenyl radicals on which any substituents are selected from the group consisting of hydroxy, amido, carbo lower alkoxy, lower alkoxy, phenoxy, naphthoxy, cyano, thiophenoxy, lower alkoyl, 5- and 6-membered cycloalkyl tri (loweralkyl) ammonium lower alkyl, with, on the alkyl groupings only, a nitro group, and, on the phenyl radicals only, a halogen atom; and taken together, A and B represent a member selected from the group consisting of —CH$_2$—CH$_2$—, —CH(CH$_3$)—,
—CH=CH—CH=CH—,
—CH=CH—CH=N—, and
—CH=CH—N=CH—;

R and R' independently represent a member selected from the group consisting of hydrogen, chloro, bromo, lower alkyl, and phenyl radicals;

X represents a divalent radical of the formula

—CH$_2$—(O)$_n$—(CH$_2$)$_m$—

Y represents a divalent radicl of the formula

—(CH$_2$)$_p$—(O)$_n$—CH$_2$—

Z represents a divalent radical of the formula

—(CH$_2$)$_p$—(O)$_n$—(CH$_2$)$_2$— and;
n is one of the numbers 0 and 1;
m is one of the numbers 1 and 2; and
p is one of the numbers 2 and 3.

4. An electrically conductive, pressure sensitive adhesive composite having a formulation comprising:

| CHEMICALS | [AMOUNTS] PARTS BY WEIGHT |
|---|---|
| Polyisobutylene (molecular weight range about 50,000–56,000) | 25–30 |
| Polyisobutylene (molecular weight range about 57,000–68,000) | 5.0–6 |
| Cross-linked sodium carboxymethylcellulose | 14.7–16.0 |
| Pectin | 9.7–11 |
| Butylated hydroxytoluene | 0.30–0.40 |
| 2, 4, 4'-trichloro-2'-hydroxydiphenyl ether | 0.15–0.25 |
| [Ether | 0.15–0.25] |
| Water | 25–30 |
| quaternary ammonium conductive polymer | 25–30 |

5. The adhesive composite as described in claim 4 wherein said quaternary ammonium polymer, is polymerized from monomers selected from the group consisting of

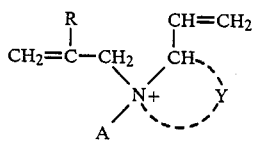

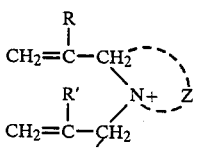

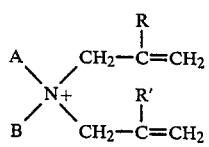

or

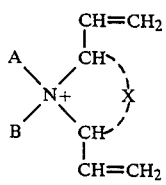

wherein
A and B independently represent a member selected from the class consisting of alkyl and phenyl radicals on which any substituents are selected from the group consisting of hydroxy, amido, carbo lower alkoxy, lower alkoxy, phenoxy, naphthoxy, cyano, thiophenoxy, lower alkoyl, 5- and 6-membered cycloalkyl tri (loweralkyl) ammonium lower alkyl, with, on the alkyl groupings only, a nitro group, and, on the phenyl radicals only, a halogen atom; and taken together, A and B represent a member selected from the group consisting of —CH$_2$—CH$_2$—, —CH(CH$_3$)—CH(CH$_3$)—,
—CH=CH—CH=CH—,
—CH=CH—CH=N—, and
—CH=CH—N=CH—;

R and R' independently represent a member selected from the group consisting of hydrogen, chloro, bromo, lower alkyl, and phenyl radicals;

X represents a divalent radical of the formula

—CH$_2$—(O)$_n$—(CH$_2$)$_m$—

Y represents a divalent radicl of the formula

—(CH$_2$)$_p$—(O)$_n$—CH$_2$—

Z represents a divalent radical of the formula

—(CH$_2$)$_p$—(O)$_n$—(CH$_2$)$_2$— and;
n is one of the numbers 0 and 1;
m is one of the numbers 1 and 2; and
p is one of the numbers 2 and 3.

6. A method of making an adhesive composite, comprising the steps of:
forming a mixture of 25–30 parts by weight of polyisobutylene having a molecular weight of about 50,000–56,000 and 5–6 parts by weight of polyisobutylene having a molecular weight of about 57,000–68,000, these visoelastic polymers being combined in a 6 to 1 ratio respectively;

adding 14.7–16.0 parts by weight of water receptive carboxymethylcellulose polymers and 9.7–11 parts by weight of humectants to said mixture; mixing said mixture for a time sufficient to ensure uniform dispersion of said water receptive carboxymethylcellulose polymers and said humectant with said viscoelastic polymers;

adding 0.3-0.4 parts by weight of preservative and 0.15-0.25 parts by weight of microbial static agents to said mixture;

mixing said mixture to disperse said preservative and microbial agents throughout said mixture;

adding 25-30 parts by weight of water and 25-30 parts by weight of a quaternary ammonium electrically conductive polymer to said mixture, said water and said electrically conductive quaternary ammonium polymer being added to said mixture in four aliquots with about 45 minutes of mixing between each addition; and mixing said mixture until said composite has a dough-like consistency.

7. A method as described in claim 6 wherein said quaternary ammonium electrically conductive polymer is polymerized monomers selected from the group consisting of:

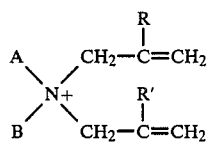

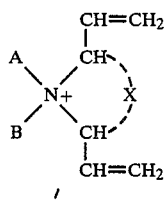

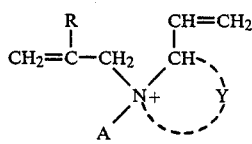

or

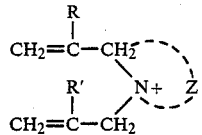

wherein

A and B independently represent a member selected from the class consisting of alkyl and phenyl radicals on which any substituents are selected from the group consisting of hydroxy, amido, carbo lower alkoxy, lower alkoxy, phenoxy, naphthoxy, cyano, thiophenoxy, lower alkoyl, 5- and 6-membered cycloalkyl, tri (loweralkyl) ammonium lower alkyl, with, on the alkyl radicals only, a halogen atom; and taken together, A and B represent a member selected from the group consisting of —CH$_2$—CH$_2$—, —CH(CH$_3$)—CH(CH$_3$)—,
—CH=CH—CH=CH—,
—CH=CH—CH=N—, and
—CH=CH—N=CH—;

R and R' independently represent a member selected from the group consisting of hydrogen, chloro, bromo, lower alkyl, and phenyl radicals;

X represents a divalent radical of the formula

—CH$_2$—(O)$_n$—(CH$_2$)$_m$—

Y represents a divalent radical of the formula

—(CH$_2$)$_p$—(O)$_n$—CH$_2$—

Z represents a divalent radical of the formula

—(CH$_2$)$_p$—(O)$_n$—(CH$_2$)$_2$— and;

n is one of the numbers 0 and 1;
m is one of the numbers 1 and 2; and
p is one of the numbers 2 and 3.

8. A method as described in claim 6 wherein said humectant is selected from the group consisting of pectins, alginates, gums, and gelatins.

* * * * *

UNITED STATES PATENT AND TRADEMARK OFFICE
CERTIFICATE OF CORRECTION

PATENT NO. : 4,830,776

DATED : May 16, 1989

INVENTOR(S) : James A. Thompson

It is certified that error appears in the above-identified patent and that said Letters Patent is hereby corrected as shown below:

Column 8, claim 1, line 23 "Quartesnary" should be --Quatenary--.

Signed and Sealed this

Twenty-first Day of August, 1990

Attest:

HARRY F. MANBECK, JR.

*Attesting Officer*   *Commissioner of Patents and Trademarks*